United States Patent
Kumbhari et al.

(10) Patent No.: US 10,033,593 B2
(45) Date of Patent: *Jul. 24, 2018

(54) USING TIMESTAMPS TO ANALYZE NETWORK TOPOLOGIES

(71) Applicant: International Business Machines Corporation, Armonk, NY (US)

(72) Inventors: Uday K. Kumbhari, Karnataka (IN); Rahul B. Rege, Ratnagiri (IN)

(73) Assignee: International Business Machines Corporation, Armonk, NY (US)

( * ) Notice: Subject to any disclaimer, the term of this patent is extended or adjusted under 35 U.S.C. 154(b) by 190 days.

This patent is subject to a terminal disclaimer.

(21) Appl. No.: 14/919,838

(22) Filed: Oct. 22, 2015

(65) Prior Publication Data

US 2017/0012826 A1    Jan. 12, 2017

Related U.S. Application Data

(63) Continuation of application No. 14/793,946, filed on Jul. 8, 2015.

(51) Int. Cl.
    *H04L 12/24*    (2006.01)
    *H04L 12/721*   (2013.01)
    (Continued)

(52) U.S. Cl.
    CPC ............ *H04L 41/12* (2013.01); *H04L 43/106* (2013.01); *H04L 45/02* (2013.01); *H04L 45/26* (2013.01);
    (Continued)

(58) Field of Classification Search
None
See application file for complete search history.

(56) References Cited

U.S. PATENT DOCUMENTS 7,478,145 B2   1/2009  Braun et al.
7,742,426 B2   6/2010  Schumacher et al.
(Continued)

FOREIGN PATENT DOCUMENTS

EP    1811724 B1   8/2009
EP    2677690 A1   12/2013

OTHER PUBLICATIONS

Lowekamp et al., "Topology Discovery for Large Ethernet Networks," SIGCOMM'01, Aug. 27-31, 2001, San Diego, California, USA, © 2001 ACM 1-58113-411-8/01/0008, 12 pgs.
(Continued)

*Primary Examiner* — Chirag Shah
*Assistant Examiner* — Srinivasa Reddivalam
(74) *Attorney, Agent, or Firm* — Nicholas D. Bowman

(57) ABSTRACT

A network of physically linked elements includes at least a first switch, a second switch, and a third element. The third element is caused to transmit a data unit. A first timestamp and a second timestamp are obtained from the first and second switches, respectively. The first timestamp is associated with receipt of the transmitted data unit by the first switch and the second timestamp associated with receipt of the transmitted data unit by the second switch. The first timestamp and the second timestamp are compared. Based on the comparison, a determination is made that the first switch is physically located between the third element and the second switch.

2 Claims, 3 Drawing Sheets

(51) Int. Cl.
*H04L 12/947* (2013.01)
*H04L 12/741* (2013.01)
*H04L 12/26* (2006.01)
*H04L 12/751* (2013.01)
*H04L 29/12* (2006.01)

(52) U.S. Cl.
CPC ............ H04L 45/66 (2013.01); H04L 45/745 (2013.01); H04L 49/25 (2013.01); *H04L 61/2007* (2013.01); *H04L 61/2038* (2013.01); *H04L 61/6022* (2013.01)

(56) References Cited

U.S. PATENT DOCUMENTS

| | | |
|---|---|---|
| 7,778,203 B2 | 8/2010 | Zhao et al. |
| 8,270,318 B1 | 9/2012 | Kumbhari |
| 2007/0147261 A1* | 6/2007 | Schumacher ........... H04L 41/12 370/248 |
| 2007/0195797 A1* | 8/2007 | Patel .................... H04J 3/0685 370/400 |
| 2013/0322298 A1 | 12/2013 | Alexander, Jr. et al. |
| 2015/0117256 A1* | 4/2015 | Sabaa .................... H04L 49/15 370/254 |
| 2016/0149788 A1* | 5/2016 | Zhang .................... H04L 43/10 709/224 |

OTHER PUBLICATIONS

Kumbhari et al., "End Host Physical Connection on a Switch Port Using Multiple Ethernet Frames," U.S. Appl. No. 14/522,806.

Kumbhari et al., "Using Timestamps to Analyze Network Topologies," U.S. Appl. No. 14/793,946, filed Jul. 8, 2015.

List of IBM Patents or Patent Applications Treated as Related, Oct. 20, 2015, 2 pages.

* cited by examiner

USING TIMESTAMPS TO ANALYZE NETWORK TOPOLOGIES

BACKGROUND

The present disclosure relates to networks and, more specifically, to using timestamps to analyze network topologies.

Ethernet is a computer technology used for communicating over a local area network (LAN). A method of organizing data for transfer over an Ethernet computer network uses Ethernet frames as data units. In this method, data or commands that are transferred over the network may be broken up into the Ethernet frames, which are small portions of data.

SUMMARY

According to embodiments of the present disclosure, aspects of the disclosure may include a method for analyzing topology within a network of physically linked elements. The elements include at least a first switch, a second switch, and a third element. As part of the method, the third element is caused to transmit a data unit. A first timestamp and a second timestamp are obtained from the first and second switches, respectively. The first timestamp is associated with receipt of the transmitted data unit by the first switch and the second timestamp is associated with receipt of the transmitted data unit by the second switch. The first timestamp and the second timestamp are compared. Based on the comparison, a determination is made that the first switch is physically located between the third element and the second switch.

According to embodiments of the present disclosure, aspects of the disclosure may also include a computer program product for analyzing topology within a network of physically linked elements. The elements include at least a first switch, a second switch, and a third element. The computer program product comprises a computer readable storage medium having program instructions embodied therewith. The program instructions are executable by a computer to cause the computer to perform a method. As part of the method, the third element is caused to transmit a data unit. A first timestamp and a second timestamp are obtained from the first and second switches, respectively. The first timestamp is associated with receipt of the transmitted data unit by the first switch and the second timestamp is associated with receipt of the transmitted data unit by the second switch. The first timestamp and the second timestamp are compared. Based on the comparison, a determination is made that the first switch is physically located between the third element and the second switch.

According to embodiments of the present disclosure, aspects of the disclosure may also include a system. The system includes a network of physically linked elements. The elements include at least a first switch, a second switch, and a third element. The system further includes a computer that has a memory and a processor in communication with the memory. A topology management module runs on the computer. The topology management module is configured to cause the third element to transmit a data unit. The topology management module is further configured to obtain a first timestamp and a second timestamp from the first and second switches, respectively. The first timestamp is associated with receipt of the transmitted data unit by the first switch and the second timestamp is associated with receipt of the transmitted data unit by the second switch. The topology management module is further configured to compare the first timestamp and the second timestamp and to determine, based on the comparison, that the first switch is physically located between the third element and the second switch.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of some embodiments and do not limit the disclosure.

Figure 1:
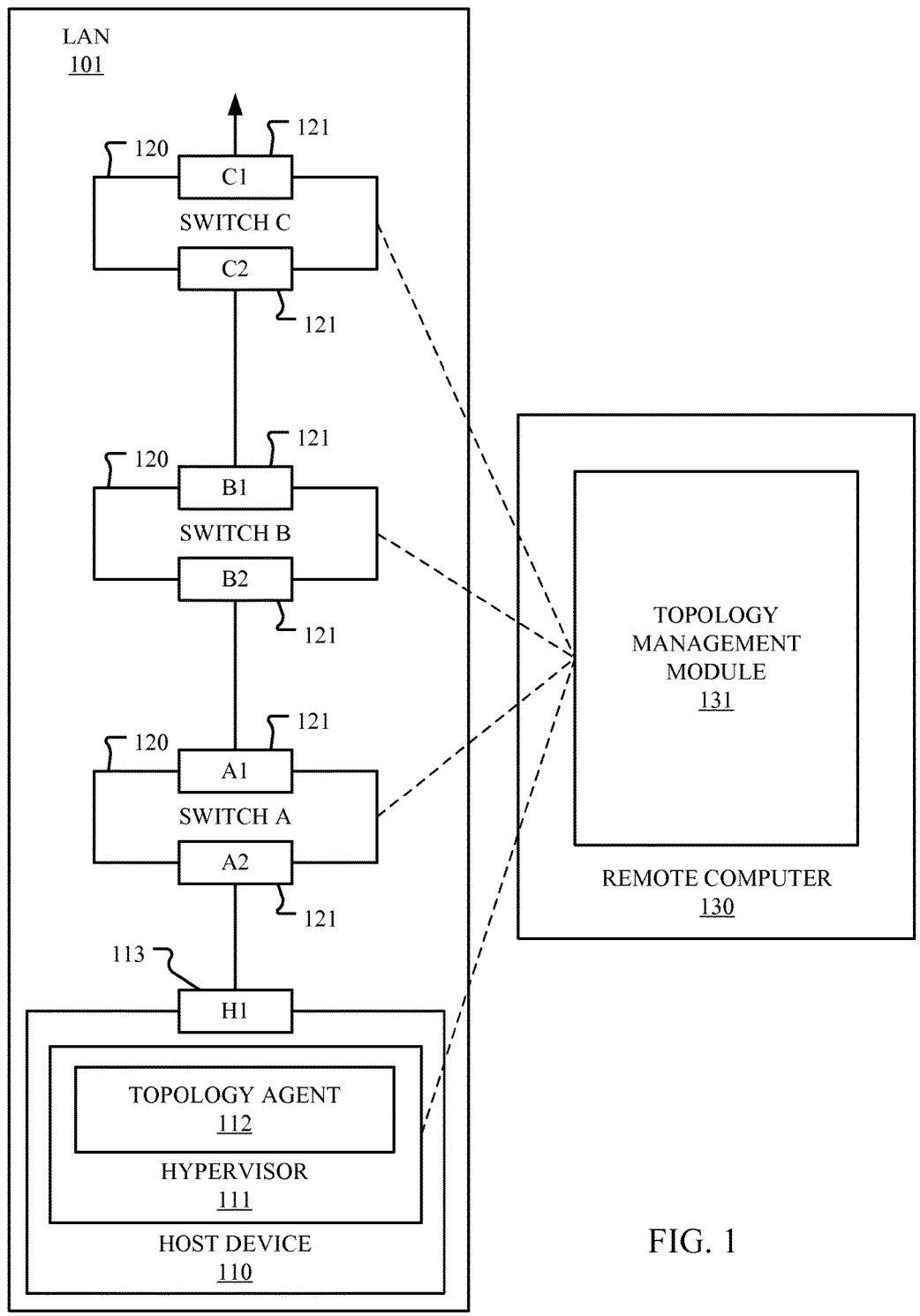
FIG. 1 illustrates a block diagram of an example topology management module configured to be used for determining physical connections between nodes in a local area network (LAN), in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to networks and, more specifically, to using timestamps to analyze network topologies. While the present disclosure is not necessarily limited to such applications, various aspects of the disclosure may be appreciated through a discussion of various examples using this context.

In the Open Systems Interconnection (OSI) model of communication systems, layer 2 refers to the data link layer in a data communications network. This layer provides the link between two directly connected nodes in a local area network (LAN). In layer 2, the applicable data unit (e.g., protocol data unit) is referred to as a frame (e.g., Ethernet frame). Layer 3 of the OSI model refers to the network layer in a data communications network. The applicable data unit in layer 3 is referred to as a packet (e.g., IP packet).

Discovery of a complete and accurate layer 2 network topology may often be important in the field of network management. Particularly in the context of data centers and cloud infrastructures, it may be helpful to discover the physical connectivity between switches (e.g., network switches) and/or between switches and host devices (e.g., end hosts). In some situations, different techniques may be used to discover a physical connection between a switch and an end host. Some of these techniques may involve analyzing the forwarding database (FDB) tables of the switches.

As used herein a forwarding database (FDB) table may refer to a table in the memory of a network switch that captures the media access control (MAC) addresses of other nodes in its network (e.g., LAN) for the purpose of Ethernet frame routing. In use, a switch may learn the MAC address of a possible future destination node by observing the source MAC address of an Ethernet frame arriving into the switch through one of its various ports. For example, one switch might have the following FDB table:

| MAC Address | Switch Port |
|---|---|
| 00:00:00:00:00:01 | A1 |
| 00:00:00:00:00:02 | A2 |
| 00:00:00:00:00:03 | A1 |
| 00:00:00:00:00:04 | A3 |

In this example, the first entry in the this FDB table means that a first Ethernet frame with a source MAC address of 00:00:00:00:00:01 was received by the switch on port A1, so the switch learned the MAC address 00:00:00:00:00:01 on port A1, and updated the FDB table accordingly. From this point onwards, if the switch receives any Ethernet frame with a destination MAC address of 00:00:00:00:00:01, it would know to forward that packet out of port A1.

In some situations, analyzing FDB tables to discover physical connections may be associated with certain potential limitations. In particular, the presence of a particular MAC address in the FDB table associated with a particular switch port does not necessarily mean that a destination with that particular MAC address is directly and physically connected to that particular port. It may simply mean that a destination with that particular MAC address can be reached through that particular switch port. Between that particular switch port and the destination, there may be zero or more other switches. In such a situation, that particular MAC address of the destination may potentially appear in the FDB tables of the ingress switch ports on each switch in that path. Thus, without more information, it may not be possible to determine the switch to which the destination is physically connected.

Another potential limitation associated with analyzing FDB tables to discover physical connections is that, in some situations, each entry in the FDB table may have a time limitation that causes the entry to expire eventually, at which time the expired entry may be removed from the FDB table. Thus, once a MAC address has been learned on a switch port, if no further packets arrive on that port with that source MAC address within the expiry period, then that MAC address entry may be flushed from the FDB table on that port.

Yet another potential limitation associated with analyzing FDB tables to discover physical connections is that, in some situations, obtaining information from FDB tables may require the use of mechanisms that put heavy loads on the switches. For example, some topology discovery products may use either simple network management protocol (SNMP) queries (e.g., GET, GETNEXT, GETBULK, etc.) or switch command line interfaces to obtain information from FDB tables. These interfaces may lack the ability to obtain less than all of the entries from a FDB table. Thus, to check for the presence of a single MAC address, an entire FDB table may have to be queried. This may add to network traffic and require lots of memory and many CPU cycles.

Yet another potential limitation associated with analyzing FDB tables may occur in environments that employ server virtualization. In such situations, a hypervisor residing on a host device may be connected to a switch port through a network adapter of the host device. This network adapter may have a specific MAC address. Then, for each virtual machine that gets created and runs on top of the hypervisor, a new MAC address may be dynamically created and assigned by the hypervisor to the virtual machine. As Ethernet frames are sent from these virtual machines, the MAC addresses of the virtual machines (rather than the MAC address of the physical network adapter or the hypervisor itself) may be learned in the FDB table of the connecting switch port. This may mean that the physical network adapter's MAC address is either never learned by that FDB table or, if learned, expires.

In some embodiments of the present invention, network topologies may be analyzed and physical connections between network nodes in a LAN may be determined (e.g., discovered) based on using timestamps obtained from FDB table entries. More specifically, in some embodiments, a topology agent residing on a host device and having a unique MAC address may transmit a single data unit (e.g., Ethernet frame or IP packet) to a destination. The FDB tables of switch ports in a path between the host device and the destination may be populated with entries that each include the unique MAC address and a timestamp associated with the receipt of that unique MAC address by that particular switch port. These time stamps may then be obtained (e.g., extracted) from the switch ports and compared to each other. Based on this comparison, information about the network topology, including the relative locations of the switches in the path between the host device and the destination, may be determined.

Referring now to FIG. 1, shown is a block diagram of an example topology management module configured to be used for determining physical connections between nodes in a LAN, in accordance with embodiments of the present disclosure. As shown, LAN 101 includes a host device 110 and switches 120 in a network of physically linked elements. The elements may be connected via Ethernet links. In some embodiments, LAN 101 may include any number of each of various types of nodes (e.g., end hosts, switches).

Residing on the host device 110 is a hypervisor 111. In use, the hypervisor 111 may be responsible for generating and hosting virtual machines. For each virtual machine that is generated, the hypervisor 111 may assign a new, unique MAC address. In addition, the hypervisor 111 may generate and host a topology agent 112. In some embodiments, the topology agent 112 may be a designated virtual machine or other designated agent. Further, the primary or sole purpose of the topology agent 112 may be to transmit Ethernet frames that are tracked for topology analysis purposes. Upon its generation, the topology agent 112, like other virtual machines hosted on hypervisor 111, may be assigned a unique MAC address.

The host device 110 may also have a network adapter (e.g., network port) 113 through which Ethernet frames are transmitted or received. While a single network adapter H1 is depicted, it is contemplated that, in some embodiments, the host device 110 may have multiple network adapters 113. More specifically, in some embodiments, it may be likely that host device 110 has multiple network adapters 113 because it is acting as a host for hypervisor 111. Multiple network adapters may allow for higher bandwidth, network adapter level redundancy, connectivity to multiple switches for access to multiple physical networks, and/or switch level redundancy.

As shown, the LAN 101 includes at least three switches 120, with each switch having two switch ports (e.g., Ethernet network ports) 121. More specifically, LAN 101 includes a switch A, switch B, and switch C. Switch A has a port A2 that is physically linked to the adapter H1 of host device 110 and also has a port A1 that is physically linked to a port B2 of switch B. In addition to the port B2, switch B also has a port B1 that is physically linked to a port C2 of switch C. Switch C, in turn, has, in addition to the port C2, a port C1 that is connected to other elements (not shown) within the LAN 101. While each switch 120 is depicted as having two switch ports 121, it is contemplated that, in some embodiments, switches 120 may have any number of ports 121 physically linked to any number of elements within the LAN 101. Each switch 120 of the LAN 101 may have its own unique bridge management IP address and bridge MAC address. As used herein, a bridge MAC address (e.g., dot1dBaseBridgeAddress) may refer to the layer 2 identifier for a switch. Each switch 120 may use its respective bridge MAC address to identify itself in bridge to bridge (e.g., switch to switch) communication packets.

In some embodiments, each switch 120 may have an internal clock that it uses for creating timestamps associated with FDB table entries. These timestamps may serve multiple purposes. First, the timestamps may be used in the FDB entry expirations described herein. More particularly, by stamping an entry at the time it is made, the switch 120 is able to determine when the entry has expired and should be deleted. A second purpose for the timestamps may be to serve as the basis for network topology analysis as described herein. In some embodiments, an additional column for timestamps may be added to each FDB table. In this way each entry in the FDB table may include, among other things, the port information, the MAC address information, and the timestamp. The represented timestamps may be displayed, for example, in terms of absolute time or as time ticks (e.g., time cycles) on a counter. In some embodiments, the timestamps may be exposed to a topology management module 131 through a public interface, a switch command line interface, or other suitable interface.

Connected to the LAN 101 is a remote computer 130 that may host the topology management module 131. The topology management module 131 may include any combination of hardware and/or software components. In some embodiments, the topology management module 131 may be configured to analyze network topology of the LAN 101. As shown, by the dashed lines in FIG. 1, topology management module 131 may be in communication with some or all of the nodes within the LAN 101, including the switches 120 and the host device 110 (more specifically, the hypervisor 111 residing on the host device 110). While the topology management module 131 is depicted as being located on remote computer 130, it is contemplated that, in some embodiments, topology management module 131 may be hosted within the LAN 101, for example, on host device 110 or another end host.

In some embodiments, communication between the switches 120 and the topology management module 131 may be improved by incorporating a light-weight mechanism into each switch 120. These mechanisms may allow the switches 120 to provide specific information to, or intelligently respond to questions placed to them by, the topology management module 131. For example, the topology management module 131 may be able to use these light-weight mechanisms to ask the switches 120 questions like "Is a particular MAC address learned on the FDB table of any of your ports, and, if so, which port?" More particularly, such a question could be posed to the switches 120 as an SNMP GET request on a dot1dTpFdbAddress column, indexed by a specific MAC address. In response to the request, if that MAC address has been learned on any port of a switch 120, then such an SNMP GET request could return the port number of that port and whether that MAC address has been learned, statically configured, or other possible status information. In some embodiments, this functionality could also be provided through a command line interface. Further, in some embodiments, light-weight mechanisms or command line interfaces could also be configured to aid the topology management module 131 in instructing each switch 120 to clear entries associated with a specific MAC address from its one or more FDB tables.

Figure 2:
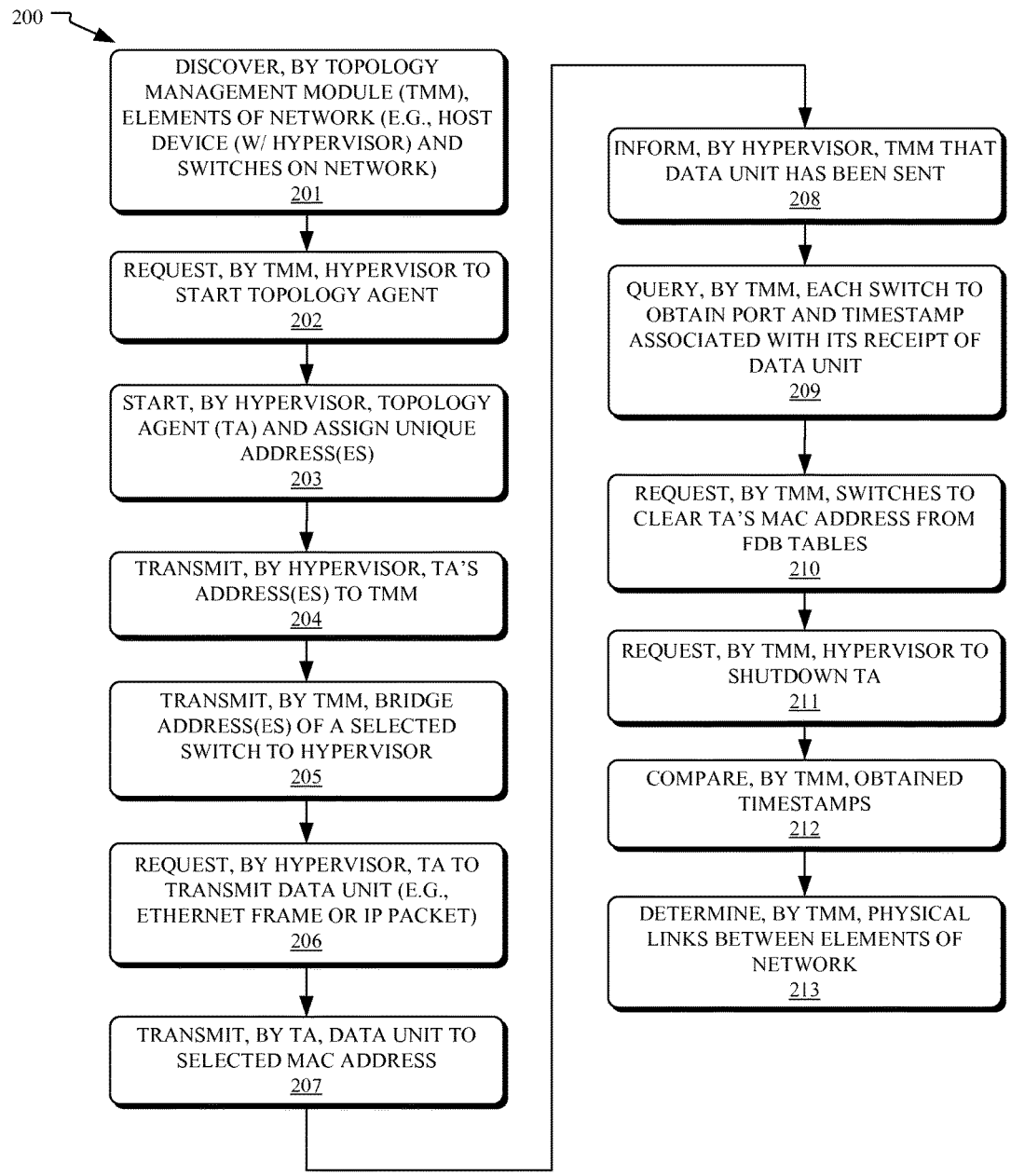
FIG. 2 illustrates a flowchart of an example method for determining physical links between elements in a LAN, in accordance with embodiments of the present disclosure.

Referring now to FIG. 2, shown is a flowchart of an example method 200 for determining physical links between elements in a LAN, in accordance with embodiments of the present disclosure. In some embodiments, one or more of the operations of the method 200 may be performed by the topology management module 131 or elements of the LAN 100 shown in FIG. 1. The method 200 may begin at operation 201, wherein a topology management module discovers elements of a network. The elements may include a host device (including a hypervisor running on the host device) as well as switches within the network. This discovery of elements (as well as other communications between the topology management module and elements of the network) may occur using any suitable communication channel, including, for example, a proprietary TCP/IP connection, SNMP, or Telnet. Using such a communication channel, the topology management module may also be able to obtain the bridge management IP addresses for the switches in the network as well as their respective bridge MAC addresses.

Per operation 202, the topology management module requests the hypervisor on the host device to start a topology agent. Per operation 203, the hypervisor starts the topology agent and assigns it a unique MAC address. In some embodiments, this unique MAC address may be dynamically created and used only for the purposes of topology analysis. This short-term, single-purpose use of this MAC address may help to simplify the topology analysis process. More particularly, any long-term or repeated use of the MAC address may make it difficult to distinguish which FDB table entries containing the MAC address are related to topology analysis and which are related to other purposes. In some embodiments, the topology agent may also be assigned a unique IP address. Further, the assigned IP address may need to be a static IP address. This may help to ensure that excess traffic is not generated during the bring-up of the topology agent.

Per operation 204, the hypervisor transmits the topology agent's unique MAC address to the topology management module. In some embodiments, the topology agent's unique IP address may likewise be transmitted. The topology management module then selects a destination for a data unit. The data unit may be a frame (e.g., Ethernet frame). In some embodiments, the data unit of interest in may be a packet (e.g., IP packet) rather than a frame. The destination may be one of the switches in the network. The selection may be made randomly, based on an algorithm, or based on a user selection. Per operation 205, the topology management module transmits the bridge MAC address of the selected switch to the hypervisor. Alternatively, in embodiments where the data unit of interest is an IP packet, the topology management module may transmit the bridge management IP address of the selected switch to the hypervisor (e.g., rather than or in addition to the bridge MAC address). Per operation 206, the hypervisor requests the topology agent to transmit a data unit to the selected destination switch. Per operation 207, the topology agent transmits the data unit to the destination switch, for example, by using the switch's bridge MAC address as the destination address in an Ethernet frame's header. Per operation 208, the hypervisor informs the topology management module that the data unit has been sent.

In some situations, an Ethertype value for switches in a LAN may be set such that if a given switch, upon receiving an Ethernet frame, determines that it is not the destination for the frame, then the switch may flood the frame through all of its ports or drop the frame instead of processing it and transmitting it further. In some embodiments, this Ethertype value may need to be changed or modified in order for the method 200 to be operable.

Per operation 209, the topology management module queries the switches of the network. The query requests information from each switch about its receipt of the data unit. Specifically, the query may ask whether the data unit was received at that switch and, if so, the port at which the data unit was received and the time at which it was received. In some embodiments, the switches may respond to this query by looking up the topology agent's MAC address in their respective FDB tables. For switches that did not receive the data unit (because they were not in the path between the host device and the destination switch), there is no applicable entries in their FDB tables and they respond to the query accordingly. For switches that did receive the data unit, they locate the applicable FDB table entries and provide the port and timestamp information from these entries to the topology management module.

In some embodiments, in response to the query, the switches may provide copies of the applicable FDB table entries (and/or entire FDB tables) to the topology management module. In such embodiments, the topology management module may need to extract the requested information from the applicable entries.

Per operation 210, the topology management module requests the switches to clear the topology agent's MAC address from their FDB tables and, per operation 211, requests the hypervisor to shut down the topology agent. This may help to ensure that there is no unwanted future network traffic to or from the topology agent.

Per operation 212, the topology management module compares the obtained timestamps and, per operation 213, determines, based on the comparison, physical links between elements of the network. More specifically, the topology management module is able to determine the relative location of the switches based on the relative time that they received the data unit and recorded that receipt in their FDB tables. In general, the farther the switch is from the host device, the later the switch will have received the data unit. Thus, the oldest timestamp is found in the FDB table of the switch physically linked to the host device and the newest timestamp is found in the FDB table of the destination switch.

In some embodiments, one or more operations of the method 200 may be repeated each time a new analysis of network topology is needed (e.g., after the physical network configuration of a network has been modified). Further, in some embodiments, the focus of a particular iteration of the method 200 may be a specific end host and further iterations may be used to analyze physical links to other end hosts in the same network.

In some embodiments, the techniques described herein may only be effective because of the innate measurable delay in the transmission of the data unit that is introduced at each switch by its internal forwarding mechanisms. This delay may cause differences between timestamps taken from switches located close to each other. Further, in some embodiments, the internal clock for each switch (based on which timestamps are generated for each of the switches' FDB table entries) may need to have high enough precision to render the delay caused by switching frames between ports to be recognizable.

Further, in some embodiments, timestamps may be created by reference to an absolute time. In such embodiments, each switch in the network may need to be synchronized to the same master clock. In other embodiments, timestamps may be created based on time ticks since the last boot-up of the switch on which they are created. In these embodiments, there may still need to be a way to find out the absolute time of the switch's last boot-up (e.g., by reference to the master clock).

In order to establish the degree of timing precision that may be required in some embodiments, one or more precision timing protocols may need to be utilized. Such protocols may include known protocols, such as IEEE 1588-2008 Precision Time Protocol, that allow Ethernet switches in a network to act as peer-to-peer transparent clocks or end-to-end transparent switches. In such embodiments, the switches themselves may simultaneously act as boundary clocks and get their times synchronized with the grand master clock in the network.

Further, in some situations, the switches of a network may support virtual local area networks (VLANs). In such situations, using VLANs may make it possible to divide a single switched network (or a single physical LAN spanning one or more connected switches) into multiple virtual networks, with packets originating from a specific VLAN being forwarded only to destinations within that VLAN. In some embodiments, the Ethernet frame being sent from a topology agent may need to be able to reach all the switches in the relevant network. Thus in some embodiments that use VLANs, these VLANs and related settings (e.g., tagging or trunking settings) on the switch ports along the path between a source host device and a destination may need to be configured such that Ethernet frames sent by a topology agent on the host device are able to reach all of the switches located between the host device and the destination. Further, in some embodiments, the source device may need to be able to ping the bridge management IP addresses of all the switches.

While an embodiment of an example method 200 is described herein, it is contemplated that, in some embodiments, many other variants on the method 200 may be possible. For example, in some embodiments, hypervisors may not need to be utilized for network topology analysis. In such embodiments, topology agents may take different forms, such as processes, daemon processes, etc. Further, in some embodiments, end hosts may act as topology agents in other ways. For example, an end host with an established MAC address could switch to a new temporary MAC address, inform the topology management module of the temporary MAC address, transmit an Ethernet frame using the temporary MAC address, and then switch back to the established MAC address. In this example, the temporary MAC address could be then used to locate entries in switch FDB tables and to determine the location of the end host in the network.

Furthermore, in some embodiments, any node within a network could act as a topology agent. For example, a switch, rather than an end host, could act as a topology agent. This may involve a switch (rather than a host device) transmitting a frame with a unique MAC address as described herein. In some embodiments where a switch acts as the source for a transmitted frame, the unique MAC address may be generated by the switch itself or may be supplied by the topology management module to the switch as it prompts transmission of the frame from the switch. Moreover, in some embodiments, any source-to-destination pairing could be used for the transmitted frame (e.g., host-to-host, switch-to-switch, switch-to-host, host-to-switch).

Furthermore, in some embodiments, a node acting as a source for a transmitted frame may be able to include any identifier (which may or may not be associated with its true MAC address or which may be a spoofed MAC address) as the listed source MAC address in the header of the transmitted frame. In such embodiments, a switch that receives the transmitted frame may include the identifier in an entry in its FDB table as though it were the true source MAC address. These embodiments may have the advantage of allowing a source node to generate a unique identifier for a frame without actually having to change its own MAC address.

To aid understanding, an example scenario employing operations of the method 200 on the LAN 101 shown in FIG. 1 is provided herein. In this example, topology management module 131 first discovers the elements in the LAN 101. At this point in the scenario, the topology management module 131 knows the elements that exist in the network but does not know how these elements are physically linked together. Next, the topology management module 131 instructs the hypervisor 111 to start the topology agent 112. The hypervisor 111 responds by starting the topology agent 112, assigning it a unique MAC address, and providing the unique MAC address to the topology management module 131. The topology management module 131 then selects, in this example, switch B as the destination for an Ethernet frame. Based on this selection, hypervisor 111 instructs the topology agent 112 to transmit the Ethernet frame to switch B using switch B's bridge MAC address. The topology agent 112 transmits the frame as instructed from the network adapter H1 of the host device 110.

To continue the example, the frame is received by the switch port A2 of switch A. Switch A then reads the header of the frame. Because topology agent 112 has a newly-created and unique MAC address, switch A does not find the unique MAC address in its FDB table. In response, switch A adds a new entry to its FDB table. The new entry indicates the unique MAC address, the fact that the frame was received at port A2, and a timestamp associated with the receipt of the frame. Next, switch A reads the destination address for the frame (i.e., switch B's bridge MAC address). Knowing that switch B is associated with port A1, switch A transmits the frame out of that port. The frame is next received by switch B at port B2. Switch B adds the appropriate new entry for the unique MAC address to its FDB table. Because switch B is the destination for the frame, it is not transmitted any further.

After the topology agent 112 has transmitted the frame, the hypervisor 111 informs the topology management module 131. In response, the topology management module 131 queries the switches 120 for information about the transmitted frame. Using the unique MAC address, switches A and B each find the appropriate entry in their respective FDB table and provide the topology management module 131 with (i) a timestamp associated with the receipt of the frame by the switch and (ii) the identity of the switch port (port A2 and B2) at which the frame was received. Switch C also looks for the unique MAC address in its FDB table; however, because switch C is not in the path between host device 110 and switch B, it never received the transmitted frame, and, therefore, has no entry that includes the unique MAC address. Switch C accordingly responds to the query by indicating that it has no applicable entry.

Once the port information and timestamps are received by the topology management module 131, it instructs the hypervisor 111 to turn off the topology agent 112 and also instructs the switches 120 to clear the entries containing the unique MAC address from their FDB tables. Next, the topology management module 131 analyzes the received timestamps. The timestamps are compared. Because the timestamp from switch A is older than the timestamp from switch B, the topology management module is able to infer that switch A is physically located between the host device 110 and switch B. In addition, because there are only two timestamps, the topology management module 131 is further able to infer that the host device 110 is physically linked to switch A and that switch A is also linked to switch B. Also based on the provided switch port information, the topology agent 131 may also be able to infer the specific ports through which the host device 110 and switches A and B are linked. In this example, because switch C did not receive the transmitted frame, the topology management module 131 is not able to determine its location within the LAN 101.

It should be noted that, in some embodiments, a single use of the method 200 of FIG. 2 may only allow a topology management module to determine some (roughly half) of the switch ports in the path between a source host device (or source switch) and a destination switch (or destination host device). More specifically, in such embodiments, only the switch ports through which the frame is received, rather than the switch ports through which the frame is transmitted, may be located and mapped. This may be due to the fact that, in some embodiments, switch ports are only associated with FDB table entries when they are the receiving ports for switches in the path of the relevant transmission. For example, consider a scenario wherein an Ethernet frame is sent from host device 110 to switch C in the LAN 101 of FIG. 1. In this scenario, the topology agent's 112 unique MAC address would be associated with (i) port A2 in an entry on switch A's FDB table, (ii) port B2 in an entry on switch B's FDB table, and (iii) port C2 in an entry on switch C's FDB table. Using information from these three entries (including timestamps), the topology management module 131 could infer (i) that host device 110 is linked (e.g., physically connected) to switch port A2 of switch A, (ii) that switch A is linked to switch port B2 of switch B, and (iii) that switch B is linked to switch port C2 of switch C. Note that, in this example, the topology management module is not able to determine (i) that it is switch port A1, specifically, that is linked to switch port B2 of switch B or (ii) that it is switch port B1, specifically, that is linked to switch port C2 of switch C.

In some embodiments, this lack of knowledge about some of the switch ports in the path may be remedied by repeating at least some of the operations of the method 200 of FIG. 2 a second or subsequent time in an opposite direction for at least a portion of the original path. This may involve using a new topology agent with the same or different unique MAC address from the topology agent 112. For example, consider an addition to the scenario described in the immediately preceding paragraph. In this scenario, assume that the LAN 101 includes a second host device physically linked to switch port C1 of switch C. As additional operations, a second topology agent on the second host device is assigned a second unique MAC address and transmits a second Ethernet frame with switch A as the destination. New entries are created in the FDB tables as a result. Specifically, the second topology agent's second unique MAC address would be associated with (i) port C1 in a second entry on switch C's FDB table, (ii) port B1 in a second entry on switch B's FDB table, and (iii) port A1 in a second entry on switch A's FDB table. Using these three new entries (including new timestamps), the topology management module 131 could infer (i) that the second host device is linked to switch port C1 of switch C, (ii) that switch C is linked to switch port B1 of switch B, and (iii) that switch B is linked to switch port A1 of switch A. Then, by combining the two sets of determinations made in the two iterations of the method 200, the topology management module could get a complete picture of the port-to-port connections physically linking switches A, B, and C together.

In some embodiments, the detecting (e.g., tracing) of physical links in a path (including specific ports) between any first node and any second node in a network may be determined by transmitting a first frame as described herein from the first node to the second node and then transmitting a second frame as described herein from the second node to the first note.

Figure 3:
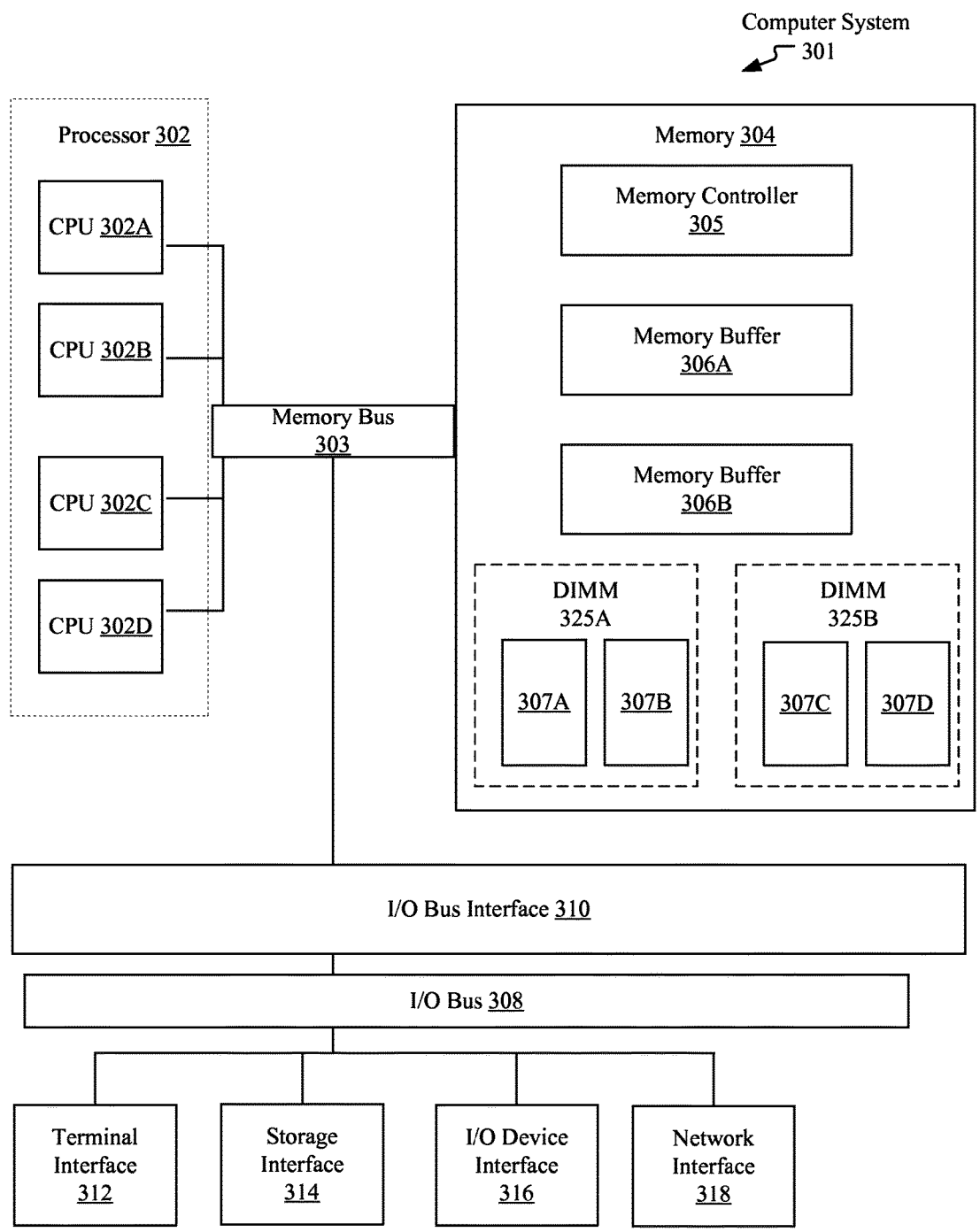
FIG. 3 illustrates a high-level block diagram of an example computer system that may be used in implementing one or more of the methods or systems described herein, in accordance with embodiments of the present disclosure.

Referring now to FIG. 3, shown is a high-level block diagram of an example computer system (i.e., computer) 301 that may be used in implementing one or more of the methods, tools, and modules, and any related functions or operations, described herein (e.g., using one or more processor circuits or computer processors of the computer), in accordance with embodiments of the present disclosure.

In some embodiments, computer system 301 may be a switch, a host device, or other computer described herein. In some embodiments, the major components of the computer system 301 may comprise one or more CPUs 302, a memory subsystem 304, a terminal interface 312, a storage interface 314, an I/O (Input/Output) device interface 316, and a network interface 318, all of which may be communicatively coupled, directly or indirectly, for inter-component communication via a memory bus 303, an I/O bus 308, and an I/O bus interface unit 310.

The computer system 301 may contain one or more general-purpose programmable central processing units (CPUs) 302A, 302B, 302C, and 302D, herein generically referred to as the CPU 302. In some embodiments, the computer system 301 may contain multiple processors typical of a relatively large system; however, in other embodiments the computer system 301 may alternatively be a single CPU system. Each CPU 302 may execute instructions stored in the memory subsystem 304 and may comprise one or more levels of on-board cache.

In some embodiments, the memory subsystem 304 may comprise a random-access semiconductor memory, storage device, or storage medium (either volatile or non-volatile) for storing data and programs. In some embodiments, the memory subsystem 304 may represent the entire virtual memory of the computer system 301, and may also include the virtual memory of other computer systems coupled to the computer system 301 or connected via a network. The memory subsystem 304 may be conceptually a single monolithic entity, but, in some embodiments, the memory subsystem 304 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

In some embodiments, the main memory or memory subsystem 304 may contain elements for control and flow of memory used by the CPU 302. This may include all or a portion of the following: a memory controller 305, one or more memory buffers 306A and 306B and one or more memory devices 325A and 325B. In some embodiments, the memory devices 325A and 325B may be dual in-line memory modules (DIMMs), which are a series of dynamic random-access memory (DRAM) chips 307A-307D (collectively referred to as 307) mounted on a printed circuit board and designed for use in personal computers, workstations, and servers. The use of DRAMs 307 in the illustration is exemplary only and the memory array used may vary in type as previously mentioned.

Although the memory bus 303 is shown in FIG. 3 as a single bus structure providing a direct communication path among the CPUs 302, the memory subsystem 304, and the I/O bus interface 310, the memory bus 303 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 310 and the I/O bus 308 are shown as single respective units, the computer system 301 may, in some embodiments, contain multiple I/O bus interface units 310, multiple I/O buses 308, or both. Further, while multiple I/O interface units are shown, which separate the I/O bus 308 from various communications paths running to the various I/O devices, in other embodiments some or all of the I/O devices may be connected directly to one or more system I/O buses.

In some embodiments, the computer system 301 may be a multi-user mainframe computer system, a single-user system, or a server computer or similar device that has little or no direct user interface, but receives requests from other computer systems (clients). Further, in some embodiments, the computer system 301 may be implemented as a desktop computer, portable computer, laptop or notebook computer, tablet computer, pocket computer, telephone, smart phone, network switches or routers, or any other appropriate type of electronic device.

It is noted that FIG. 3 is intended to depict the representative major components of an exemplary computer system 301. In some embodiments, however, individual components may have greater or lesser complexity than as represented in FIG. 3, components other than or in addition to those shown in FIG. 3 may be present, and the number, type, and configuration of such components may vary.

As discussed in more detail below, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for analyzing topology within a network of physically linked elements, the network of physically linked elements including at least a first switch, a second switch, and a third element, wherein the third element is a first host device, wherein the network of physically linked elements further includes a second host device, the method comprising:

causing the third element to transmit a data unit, wherein the data unit is a first frame transmitted by a first topology agent residing on the first host device, the first topology agent having a first media access control (MAC) address;

obtaining a first timestamp from the first switch and a second timestamp from the second switch, the first timestamp associated with receipt of the transmitted data unit by the first switch and the second timestamp associated with receipt of the transmitted data unit by the second switch, wherein the first switch has a first forwarding database (FDB) table, a first port at which the transmitted first frame is received at the first switch, and a second port, and wherein the second switch has a second FDB table, a third port at which the transmitted first frame is received at the second switch, and a fourth port;

creating, in response to receipt of the transmitted first frame by the first port, a first entry in the first FDB table, the first entry including the first MAC address, the first timestamp and the first port;

creating, in response to receipt of the transmitted first frame by the third port, a second entry in the second FDB table, the second entry including the first MAC address, the second timestamp, and the third port;

identifying, based on the first MAC address and from the first entry, the first timestamp and the first port;

identifying, based on the first MAC address and from the second entry, the second timestamp and the third port;

causing a second topology agent residing on the second host device to transmit a second frame, the second topology agent having a second MAC address;

creating, in response to receipt of the transmitted second frame by the fourth port, a third entry in the second FDB table, the third entry including the second MAC address, a third timestamp associated with the receipt of the transmitted second frame by the fourth port, and the fourth port;

creating, in response to receipt of the transmitted second frame by the second port, a fourth entry in the first FDB table, the fourth entry including the second MAC address, a fourth timestamp associated with the receipt of the transmitted second frame by the second port, and the second port;

identifying, based on the second MAC address and from the third entry, the third timestamp and the fourth port;

identifying, based on the second MAC address and from the fourth entry, the fourth timestamp and the second port;

comparing the first timestamp and the second timestamp;

determining, based on the comparing the first timestamp and the second timestamp, that the first switch is physically located between the third element and the second switch;

comparing the third timestamp and the fourth timestamp; and determining, based on the comparing the first timestamp and the second timestamp and further based on the comparing the third timestamp and the fourth timestamp, that the first host device is directly connected to the first port, that the first switch is directly connected to the third port, that the second switch is directly connected to the second port, and that the second host device is directly connected to the fourth port.

2. A method for analyzing topology within a network of physically linked elements, the network of physically linked elements including at least a first switch, a second switch, a first host device, and a second host device, the method comprising:

causing a first topology agent residing on the first host device to transmit a first data unit incorporating a first identifier associated with the first topology agent;

creating, in response to receipt of the transmitted first data unit by a first port of the first switch, a first entry in a first table of the first switch, the first entry including the first identifier, a first timestamp associated with the receipt of the transmitted first data unit by the first switch, and the first port;

creating, in response to receipt of the transmitted first data unit by a second port of the second switch, a second entry in a second table of the second switch, the second entry including the first identifier, a second timestamp associated with the receipt of the transmitted first data unit by the second switch, and the second port;

causing a second topology agent residing on the second host device to transmit a second data unit incorporating a second identifier associated with the second topology agent;

creating, in response to receipt of the transmitted second data unit by a third port of the second switch, a third entry in the second table, the third entry including the second identifier, a third timestamp associated with the receipt of the transmitted second data unit by the second switch, and the third port;

creating, in response to receipt of the transmitted second data unit by a fourth port of the first switch, a fourth entry in the first table, the fourth entry including the second identifier, a fourth timestamp associated with the receipt of the transmitted second data unit by the first switch, and the fourth port;

identifying, based on the first identifier and from the first entry, the first timestamp and the first port;

identifying, based on the first identifier and from the second entry, the second timestamp and the second port;

identifying, based on the second identifier and from the third entry, the third timestamp and the third port;

identifying, based on the second identifier and from the fourth entry, the fourth timestamp and the fourth port;

obtaining the first timestamp and the fourth timestamp from the first switch and the second timestamp and the third timestamp from the second switch;

comparing the first timestamp and the second timestamp;

comparing the third timestamp and the fourth timestamp; and determining, based on the comparing the first timestamp and the second timestamp and further based on the comparing the third timestamp and the fourth timestamp, that the first host device is directly connected to the first port, that the first switch is directly connected to the second port, and that the second switch is directly connected to the fourth port.

\* \* \* \* \*